Dec. 21, 1943.    F. W. ADAMS ET AL    2,337,435
APPARATUS FOR SURFACING GLASS
Filed Jan. 2, 1941
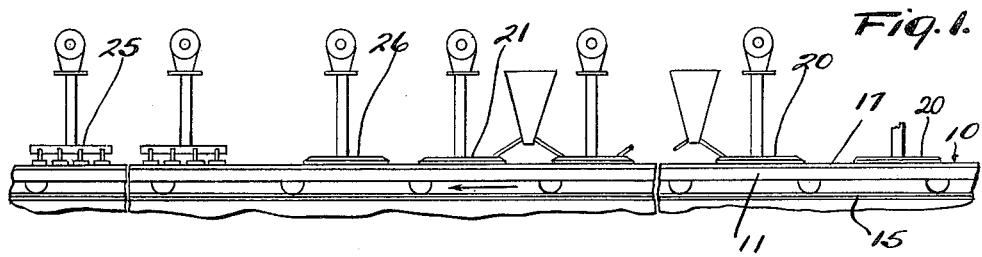
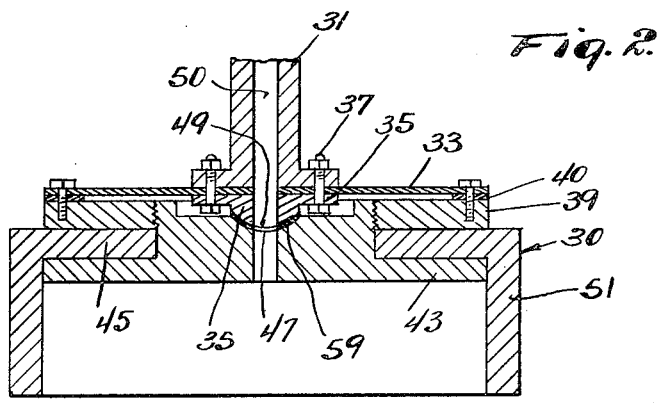
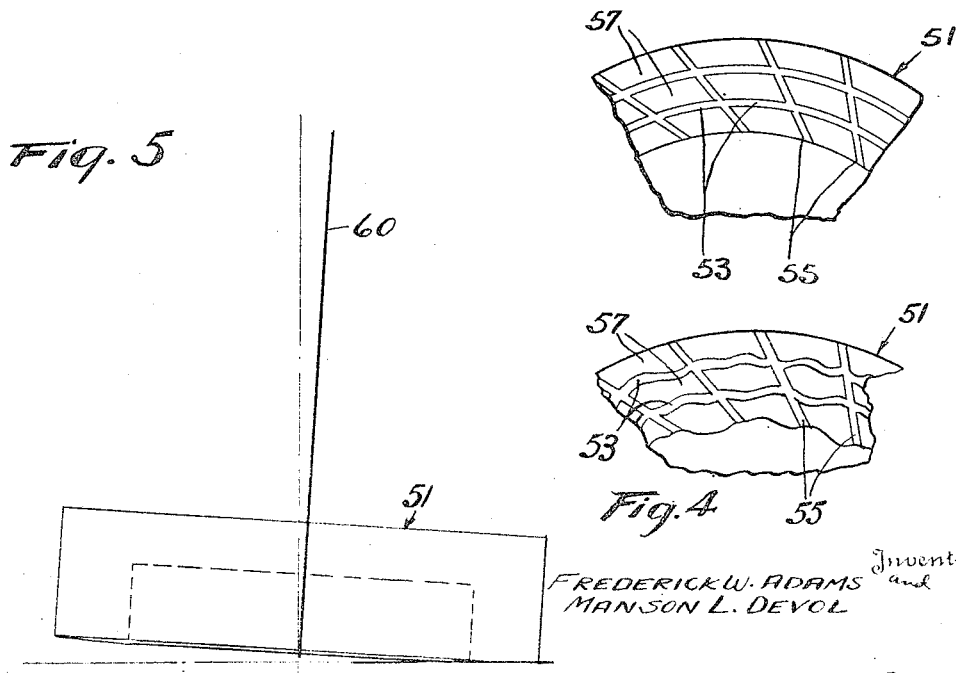
Inventors
FREDERICK W. ADAMS
and
MANSON L. DEVOL
Olen E. Bee
Attorney Patented Dec. 21, 1943

2,337,435

UNITED STATES PATENT OFFICE 2,337,435

APPARATUS FOR SURFACING GLASS

Frederick W. Adams, Pittsburgh, and Manson L. Devol, Wilkinsburg, Pa., assignors to Pittsburgh Plate Glass Company, a corporation of Pennsylvania Application January 2, 1941, Serial No. 372,730

1 Claim. (Cl. 51—209)

This invention relates to the surfacing of plate glass and it has particular relation to methods of and apparatus for minimizing and improving the operations required in grinding and polishing plate glass.

One object of the invention is to provide successive steps of surfacing plate glass wherein a number of conventionally employed grinders and polishers can be omitted and reduced equipment and power substituted without jeopardizing the quality of the polished plate glass.

Another object of the invention is to provide an improved method of surfacing plate glass in which bonded abrasive surfacers are operated in conjunction with conventional grinding and polishing operations.

Another object of the invention is to coordinate loose abrasive grinding operations with bonded abrasive grinding operations to reduce the amount of surfacing necessary to produce first-grade polished plate glass.

Another object of the invention is to provide an improved type of bonded abrasive grinding runner particularly adapted to cooperate with other types of grinding and polishing elements and to facilitate the manufacture of plate glass.

Another object of the invention is to provide an improved plate glass surface texture, or so-called smooth, preparatory to the application of polishing runners thereon.

Another object of the invention is to provide an improved method of preparing plate glass for polishing operations whereby the cost of grinding and polishing is greatly reduced as compared with conventional costs involved in prior practice.

In the preparation of finely polished plate glass, a number of expensive and precise operations have been necessary including successive grinding operations performed by a series of rotating metal runners supplied with loose abrasive, such as sand, carried in a vehicle of water. These runners operate with sand of decreasing particle size as the glass is moved along a horizontal path beneath the runners. Then the glass is subjected to another series of runners under which emery particles are employed as a so-called smoothing agent. After being subjected to the action of the emery under the latter runners, the glass is known as "smooth." The smoothing of the glass immediately precedes the operation of a series of rotatable felt runners which are supplied with rouge, or the like, at their points of frictional contact with the glass. The smoothing operation is considered to be important because it prepares the glass for the final polishing operation and the quality of the finished glass is dependent to a large extent thereon.

Since approximately thirty-eight grinding units and sixty polishing units are employed for surfacing plate glass by known methods, it is apparent that a great deal of power and machinery are required for manufacturing the finished plate glass products. It is proposed by the practice of this invention to decrease the number of grinding runners, as well as the number of polishing runners, as compared with the number employed in conventional practice, and to the extent that forty to sixty per cent of the conventional surfacing runners can be omitted. A saving in power consumption of approximately 30 per cent can thus be obtained. Also the time previously required for polishing glass can be reduced in the value of 50 to 75 per cent.

In one form of improved runner, a composition of bonded abrasive type is to be used intermediate the grinding and polishing runners and is in the form of a cupped member or members of general circular contour having a glass-engaging rim which is applied directly against the glass. This rim is preferably irregular along its edges instead of following a perfect circular contour. Water is supplied centrally of the cup, and in the rotation of the latter, the water is forced outwardly between the surfacing face and the glass by the action of centrifugal force, as well as by the action of pressure in the water line. This type of runner can be arranged in groups of two or more and mounted for rotation about a vertical axis in connection with a rotatable trunk and each runner can be driven individually, that is, there are two phases of rotation; first, the bodily rotation about the vertical axis of the main trunk and second, about the vertical axis of each individually driven runner mounted upon the trunk. The abrasive wheel is self-dressing as it performs its surfacing operation upon the glass and the rim or face of the runner which engages the glass is provided with transverse grooves and intersecting grooves to break up the surfacing portion of the runner unit into a number of relatively small grinding areas.

The amount of pressure and amount of water employed in the surfacing operation greatly influence the effectiveness of the operation. In some instances materially more pressure is required at the beginning of the operation and as the runner begins to function normally, the pressure can be lessened without disturbing the efficiency of the runner. The weight of the runner is such that lifting force can be applied until the proper pressure is attained.

As a result of surfacing the glass by using bonded abrasive runners as described, the texture of the smooth produced is characterized by a definite grain, or by striations in substantially parallel relation. When viewed under high magnification, such striations are clearly visible but are very shallow. The texture of conventional smooth on the other hand, resembles a stippled pattern and the indentations are deeper than those of the grained or striated texture.

In another type of construction of the bonded abrasive runners, the axis of each individual runner is tilted at an angle of approximately 1 to 3 degrees from the vertical for the purpose of forming a conical contour upon the surfacing rim. This type of arrangement insures freedom of expulsion of particles from within the cupped portion of the runner and also combines the advantages of a tangentially engaging roller type of grinder having a horizontal axis with those of the cup-shaped grinding runner having a vertical axis.

One of the outstanding characteristics of the conical runner lies in the unique and superior type of surface texture produced. All surfaces produced by this method have been characterized by high transparency with a resultant large increase in reflectivity over the conventional commercial smooth. Examination of this new type of smooth under high magnification indicates that the minute surface indentations, such as sand holes or marks left by the action of the abrasive, are only a fraction of the magnitude of the average indentation in the conventional commercial smooth. This type of tilted runner, like the similar structure, in which the axis is not tilted from the vertical, is operated in conjunction with a generous supply of water forced centrally into the cup portion adjacent the axis. The amount of water is not sufficient to build up pressure inside the cup, but is sufficient to maintain a full flow in all directions between the surfacing rim and the glass surface. In all of these new types of bonded abrasive runners provision is made for regulating the pressure against the glass and varying the water supply as desired, as well as varying the speed of the runner.

In the drawing:

Fig. 1 is a diagrammatic fragmentary side elevation of a grinding and polishing system; Fig. 2 is a vertical section of a bonded abrasive runner and its mounting; Figs. 3 and 4 are fragmentary bottom plans of bonded abrasive runners illustrating the contours of the surfacing rims; and Fig. 5 is a diagrammatic elevation of another form of mounting the abrasive runner.

In practicing the invention, a plate glass grinding and polishing system 10 includes glass carrying cars 11 driven along a horizontal track 15 and along which plate glass 17 is positioned in a conventional manner. Grinding runners 20 driven about vertical axes frictionally engage the glass surface and a mixture of sand and water is supplied along the area of contact of the runners with the glass during the first phases of the surfacing operation. As the glass passes underneath the runners 20, the particle size of the sand is gradually decreased at successive runners until the glass reaches a series of so-called emery runners 21, each of which may have one or more runner blocks supplied with a mixture of loose emery particles and water forced centrally therethrough upon the surface of the glass which is frictionally engaged. The operation of the emery runners in previously-known types of apparatus prepares the glass for a series of felt polishing runners 25. In the improved system at the location where the emery runners are mounted, runner units 26, including bonded abrasive runner blocks 30, are employed and the number of emery runners are reduced or entirely replaced by the bonded abrasive runners. Also a relatively smaller number of felt polishers are employed than that previously required.

Continued passage of the glass under the polishing runners completes the surfacing of the glass on one side and the operation is repeated for surfacing the other side of the glass which is turned over and again transported through the system. The mechanical operation of the runners is similar to that shown in U. S. Patent No. 1,724,704.

Each bonded abrasive runner block 30 is in the form of an inverted cup composed of a matrix of resinous, ceramic, or other suitable material in which particles of abrasive material, such as silicon, carbide, alumina, etc., have been embedded.

In one form of bonded abrasive runner, a rotatably driven shaft 31 is secured to the central portion of a resilient plate 33 by means of a lower clamping member 35 and a series of bolts 37. The marginal portions of the plate are rigidly secured to a disc collar 39 and spaced slightly therefrom in a horizontal plane by means of a gasket or washer 40. The collar 39 is rigidly secured in screw threaded relation between the clamping disc 43 and the bottom 45 of the cupped runner block.

The upper surface of the disc has a concave spherical seat 47 which receives in thrust bearing relation a similarly shaped convex bearing face 49 formed on the clamping member 35. A central passage 50 extending through the shaft 31 into the hollow of the cupped runner 30 is provided for the purpose of conveying water to the grinding face or rim 51 of the runner. Suitable grooves 53 and 55 (Figs. 3 and 4) are formed in the face of the runner to divide the latter into a plurality of surfacing areas 57 about which water can be circulated. These grooves and the inner edges of the runner face can be irregularly shaped as shown in Fig. 4. If desired, a layer of resilient material 59, such as rubber, can be interposed between the bearing faces 47 and 49.

Referring to Fig. 5, there is shown diagrammatically a rotatable shaft 60 which is rigidly connected to the cupped runner 30 in such manner that the axes of the shaft and runner are coincidental. The shaft is maintained rotatable about a fixed axis which is tilted slightly from the vertical and the face of the surfacing rim of the runner is in the form of a frustum of a cone. This conical form is only sufficient to provide for normal frictional contact with the glass along a limited area while a diametrically opposed portion of the surfacing face is raised slightly away from the glass. In this type of runner, the angle of tilting is approximately 1 to 3 degrees from the vertical. Water is supplied centrally into the cupped runner while the latter automatically dresses itself during its operation to maintain the conical contour along its rim.

Although limited practical forms of the invention have been shown and described in detail, it will be apparent to those skilled in the art that the invention is not so limited, but that various changes can be made therein without departing from the spirit of the invention or from the scope of the appended claim.

We claim:

A fixed abrasive grinding runner of cup shape and having a work-engaging rim, said rim having irregularly curved grooves traversing it and other grooves formed substantially circumferentially thereof to provide a plurality of work-engaging surfaces separated by intercommunicating grooves, the inner edge of said rim also being irregularly curved between the traversing grooves.

FREDERICK W. ADAMS.
MANSON L. DEVOL.